United States Patent [19]

Chapman

[11] B 3,921,208

[45] Nov. 18, 1975

[54] CONTACT DUPLICATION OF MAGNETIC SIGNALS UTILIZING A DUAL-MATERIAL INTERMEDIATE INCLUDING BOTH LOW $T_C$ AND HIGH $T_C$ MATERIAL

[75] Inventor: Jack C. Chapman, Bloomington, Minn.

[73] Assignee: Minnesota Mining and Manufacturing Company, St. Paul, Minn.

[22] Filed: Feb. 20, 1973

[21] Appl. No.: 333,876

[44] Published under the Trial Voluntary Protest Program on January 28, 1975 as document no. B 333,876.

[52] U.S. Cl. ..................... 360/17; 360/16; 360/131

[51] Int. Cl.$^2$ ..................... G11B 5/86; G11B 23/00

[58] Field of Search ............. 179/100.2 A, 100.2 E; 346/74 MT; 360/16, 17, 131–136

[56] References Cited

UNITED STATES PATENTS 3,699,269 10/1972 Smaller ..................... 179/100.2 E 3,725,611 4/1973 Smaller ..................... 179/100.2 A

*Primary Examiner*—Stanley H. Urynowicz, Jr.

*Assistant Examiner*—Robert S. Tupper

*Attorney, Agent, or Firm*—Alexander, Sell, Steldt & DeLaHunt

[57] ABSTRACT

Magnetic signals from a master magnetic recording medium are duplicated onto a copy magnetic recording medium by utilizing an intermediate comprising two magnetizable materials, one having low Curie temperature $T_c$ and high $H_c$ relative to the $H_c$ of the copy medium and the other having relatively high $T_c$ and low $H_c$ relative to the $H_c$ of the master medium. In one embodiment utilizing an endless belt intermediate, the signals are (1) copied from the master medium onto a high $T_c$ layer of the belt by magnetically stimulated contact duplication, (2) transferred from the high $T_c$ layer to a low $T_c$ layer of the belt by thermoremanent contact duplication, and (3) copied onto the copy medium by magnetically stimulated contact duplication.

15 Claims, 6 Drawing Figures

CONTACT DUPLICATION OF MAGNETIC SIGNALS UTILIZING A DUAL-MATERIAL INTERMEDIATE INCLUDING BOTH LOW $T_C$ AND HIGH $T_C$ MATERIAL

CROSS-REFERENCE TO RELATED APPLICATIONS

A method and an apparatus that is employed for the same purpose as the present invention, but utilizes an intermediate having a single homogeneous magnetizable layer, is disclosed and claimed in U.S. application Ser. No. 333,878. Now U.S. Pat. No. 3,827,077, filed of even date herewith. Details concerning preparation of such a single-layer intermediate are disclosed in U.S. application Ser. No. 333,877, also filed of even date herewith. Such details may be helpful in preparation of the intermediate transfer medium of the present invention.

FIELD OF THE INVENTION

This invention relates to method and apparatus for copying magnetic signals from a master tape onto a copy tape, and specifically for making copies at high speed by contact duplication. The invention makes use of a novel tape or belt intermediate.

BACKGROUND OF THE INVENTION

U.S. Pat. No. 2,738,383 (Herr et al.) teaches that signals recorded on a master magnetic recording tape may be duplicated by placing face-to-face the magnetizable surfaces of the master tape and an unrecorded copy tape and moving them through a gradually diminishing field such as a magnetic idealizing field. The Herr patent has not been used commercially for making copies of audio tapes, in part because electronic equipment is available for making such copies at high speeds. As for video tapes, high speed electronic copying equipment is considered to be unfeasible so that copies are generally made at low speeds and at a cost which is too great for truly widespread use.

High speed contact duplicating equipment has recently been introduced for video use, but it requires the signals recorded on the master tape to be a mirror image of the signals transferred to the copy. To produce electronically recorded mirror masters requires a special recorder for each of the large variety of recording formats.

There continues to be a need for high speed duplication of asymmetrical video tapes without requiring mirror masters. U.S. Pat. No. 3,496,304 (Nelson) avoids the need for a mirror master by using an intermediate such as a drum having a coating of magnetizable material of low Curie temperature. The magnetizable material of the drum is heated above the Curie temperature, and the master is pressed against the drum while the magnetizable material of the drum cools below the Curie temperature before separating from the master, thus copying signals from the master onto the drum. An unrecorded copy tape is then pressed against the drum and subjected to a magnetic field sufficient to copy the signals onto the copy tape. Subsequent heating erases the signals from the drum to prepare it for repeated cycles.

The Nelson patent lacks sufficient information to enable construction of a practical device. For example, it does not teach how to construct the intermediate and virtually disregards the heat transfer problems.

OTHER PRIOR ART

In addition to Herr and Nelson, a number of patents relate to contact duplication. U.S. Pat. No. 3,364,496 (Grenier et al.), No. 3,465,105 (Kumada et al.) and No. 3,632,898 (Slade) concern thermal transfer involving heating the copy tape to approximately its Curie temperature and No. 3,472,971 (van den Berg) concerns magnetically stimulated copying. Each of these by itself would require a mirror master tape for copying asymmetrical recordings.

THE PRESENT INVENTION

The present invention provides commercially practical copying from master magnetic recording media to copy magnetic recording media, without the need for making mirror masters of asymmetrical recordings. This may be accomplished through the use of a magnetizable intermediate such as a drum, tape or belt having at least one layer of magnetizable material of normally high $H_c$ (e.g., 500–3000 oersteds coercivity)* and low Curie temperature $T_c$ (e.g., 50–350°C), and at least one other layer of magnetizable material having a Curie temperature higher than that of the low $T_c$ layer, preferably at least 50°C higher. The two types of magnetizable material may be blended in a single layer, but thus far this has not been done as successfully as with separate layers.

*Magnetic values are here measured at 20°–25°C using a 60 -Hz 3,000-oersted peak applied field.

The dual-material intermediate may be used to make direct image copies of magnetic signals from a master medium having an $H_c$ higher than that of the high $T_c$ material onto a copy medium having an $H_c$ lower than that of the low $T_c$ material. To do this, the magnetizable face of the master medium is pressed into intimate contact with the magnetizable face of the intermediate and moved therewith through a first magnetic idealizing field. The magnetic idealizing field exceeds the $H_c$ of the high $T_c$ material of the intermediate but should be at least 50 oersteds less than the $H_c$ of the master medium so that signals recorded on the master medium are copied onto the high $T_c$ material of the intermediate without affecting the master. The low $T_c$ material of the intermediate is then heated to approximately its Curie temperature or above and subsequently cooled below that temperature, thus copying onto the low $T_c$ material the signals carried by the high $T_c$ material. The magnetizable face of the copy medium is pressed against the face of the cooled intermediate and moved therewith through a second magnetic idealizing field. This idealizing field exceeds the $H_c$ of the copy medium but is less than the $H_c$ of the low $T_c$ material of the intermediate. Because there are two mirror transfers of the signals, the copy medium receives a direct image of the master medium except with reversed magnetic polarities.

For optimum results, the magnetizable face of the intermediate has been cooled to approximately room temperature or below when it contacts the copy medium in order to afford high magnetic moment in the low $T_c$ material during the copying. Moreover, if the temperature of the intermediate is at room temperature during the copying, there should be no change in signal dimensions between the master medium and copy medium stations. In contrast, the Nelson U.S. Pat. No. 3,496,304 copies kthe master medium while the drum is hot and transfers the signals to the copy medium after the drum has cooled.

The system of the present invention may include one or more copy stations, and the magnetic idealizing field at each copy station should be at least 50 oersteds less than the $H_c$ of the low $T_c$ material of the intermediate so that the signals carried by the low $T_c$ material are essentially unaffected upon being duplicated. After passing the last copy station, both magnetic materials of the intermediate are erased before contacting the master tape in the next cycle.

The $H_c$ of the high $T_c$ material of the intermediate should not exceed one-half the $H_c$ of the master medium unless the magnetizable material of each is highly uniform to provide narrow magnetic switching distribution. While keeping its $H_c$ below that of the master medium, the $H_c$ of the high $T_c$ material is desirably as high as possible as long as it does not significantly degrade the copying of signals from the low $T_c$ layer of the intermediate onto the copy medium. The room temperature $H_c$ of the low $T_c$ material is preferably as large as possible, although it would be difficult to erase magnetically if above 3,000 oersteds. It should be at least twice the coercivity of the copy medium unless the magnetic switching distribution of each of the low $T_c$ material and copy medium is narrow. Many video tapes have coercivities of 300–350 oersteds, but some commercial video tapes have an $H_c$ of 500–700 oersteds. Hence, it is preferred that the $H_c$ of the low $T_c$ material be at least 1000 oersteds, or better, at least 1,500 oersteds for efficient duplication onto copy media having an $H_c$ of 500–700 oersteds. On the other hand, it may be desirable that the high $T_c$ material have an $H_c$ of 100–150 oersteds for efficient duplication from a 300-oersted master.

A preferred intermediate of the present invention has a low $T_c$ layer provided by a binder-free coating of approximately $M_2P$ where P is primarily phosphorous and M consists essentially of a combination of at least two transition metals providing a Curie temperature of 50°–200°C, a $B_r$ of at least 1,500 gauss and an $H_c$ of at least 1,000 oersteds. Such a layer may be obtained by a sputtered coating of approximately $M_2P$ where M is 80–90 mole percent iron, 10–20 mole percent cobalt and 0–5 mole percent nickel. A preferred binder-free high $T_c$ layer may be formed from iron, cobalt, nickel or alloys thereof.

A preferred embodiment of the present invention employs an endless belt, the backing of which is preferably a metal of low permeability such as copper alloyed with a small amount of beryllium. Other copper-based alloys such as those containing small amounts of silver and magnesium are also useful as are aluminum, aluminum-based alloys, and "Havar" (a cobalt-based super alloy). Stainless steels may be used which do not hold appreciable magnetism. Such metals withstand repeated heating and cooling without damage and can be used for long periods without appreciable deterioration. A metal backing provides good thermal conductivity, permitting the magnetizable coating to be heated and cooled by contacting the reverse side of the belt successively with heated and cooled drums. Improved heat transfer is attained by applying a light coating of grease onto the drum surfaces.

A metal backing should be thin (e.g., 0.025–0.15 mm) in order to minimize thermal transfer requirements and to minimize the spacing between the sources of the magnetic idealizing fields and the media they stimulate if the sources are located on the opposite side of the metal backing. Preferably a metal backing has a thickness of at least 0.075 mm to make it easier to handle without wrinkling, easier to guide from its edges, and easier to splice if the belt is spliced. The backing preferably has sufficient strength to permit it to be operated under moderately high tension such as 2 kg per cm of width. Then if the belt is unsupported at either position at which it is contacted by the master and copy media, a device such as a roller can force the medium against the tension in the belt and beyond the normal path of the belt to afford intimate contact between the medium and the belt.

By using a polymeric backing for the belt, the requirements for heating and cooling are greatly minimized. A polymeric backing also facilitates magnetic stimulation of the magnetizable materials if the sources of the stimulation are located on the opposite side of the belt. The magnetizable face of the belt may be radiantly heated to approximately the Curie temperature of the low $T_c$ material and then quickly cooled by convection before substantial heating of the polymeric backing. Under such circumstances the circumference of the belt can be much smaller than a metal-backed belt, permitting the complete apparatus to be more compact and less expensive. Preferred polymeric backings have good high temperature properties such as polyimides (e.g., "Kapton") or polysulfones ("Astral").

The intermediate may be a drum formed from a firm insulating material, in which event it preferably is primarily metal having a layer of insulation to which the magnetizable material is applied. The insulating layer can be quite thin if the magnetizable material is radiantly heated and quickly cooled before appreciable heat is conducted to the metal.

A preferred metal backing for a belt intermediate has been made from beryllium copper (CDA 172 full hard) of 150 cm length, 0.1 mm thickness, and 3.2 cm width to accommodate tapes up to about 2.5 cm in width. In order to provide true edges, about 20–30 strips of the backing were clamped together, their edges were milled to be parallel within 0.001 cm per cm of length, and their ends were milled to be parallel within 0.001 cm per cm of width. The ends of each strip were fused together by electron-beam butt welding to provide an endless belt. By polishing the splice with abrasive sheets of successively finer grit followed by polishing the whole belt with an abrasive paste, a finish of about 0.05 micrometer (root mean square) was attained.

The belt was mounted on pulleys of sputtering apparatus as described in the aforementioned patent application Ser. No. 333,877 together with as ingot target of essentially $(Fe_{0.85}Co_{0.15})_2P_{1.1}$, the excess phosphorous allowing for some loss during sputtering. As disclosed in that application, the pressure was reduced to about $5 \times 10^{-6}$ torr and the filament was heated to its normal operating condition of 50 amps, 20 volts AC, after which argon gas was introduced, increasing the pressure to about $10^{-2}$ torr. A positive potential of about 200 volts above the filament was applied to the anode, producing and igniting a gaseous discharge. At equilibrium the anode operated at 3.4 amps and 61 volts DC.

While the belt was driven at 1.8 cm/minute, a negative DC potential of 135 volts was applied to the target, and a negative DC potential of 175 volts (both with respect to the anode) was applied to the belt during one pass of the belt to prepare the outer surface of the belt for a sputtered coating. Then while shielding the belt with a shutter, the negative DC potential of the target was increased to 1,580 volts for 20 minutes to clean the target and to bring its temperature and the environs to a steady state condition. Then the negative DC potential as the belt was reduced to 3.4 volts, the shutter was opened, and sputter deposition of the phosphide target onto the outer surface of the belt proceeded for about 3 hours, or slightly more than two complete belt passes. The final phosphide coating [believed to be essentially $(Fe_{0.85}Co_{0.15})_2P$] had a thickness of approximately 0.6 micrometer and exhibited a $B_r$ (remanent flux density) of 1,800–2,000 gauss, an $H_c$ of 1,600–2,000 oersteds and a Curie temperature of 110°–140°C.

The phosphide source was replaced by an iron source, but before bombarding the iron, the apparatus was operated to provide a glow discharge to prepare the phosphide surface for subsequent coating. The iron was then bombarded with the argon ions while the belt made four passes per hour until an outer layer of about 0.06 micrometer had built up over a period of 1 hour. During this procedure, the sputtering power was kept relatively low so that the belt was heated only to about 50°–100°C. The $H_c$ of the deposited iron layer was about 100–300 oersteds, and its $B_r$ was about 14,000–18,000 gauss.

Where the intermediate has a high $T_c$ material as an outer magnetizable layer as in the above-described belt, it acts as a spacer between the low $T_c$ inner material and the copy tape and should be very thin. Thicknesses up to about 0.25 micrometer can be used, preferably less than 0.1 micrometer. One such outer layer should be sufficient as the sole high $T_c$ material of the intermediate and may have a thickness of 0.01–0.2 micrometer.

Where the intermediate has a low $T_c$ material as an outer magnetizable layer, the outer layer should not exceed 0.4 micrometer in thickness and preferably is less than 0.2 micrometer since it acts as a spacer between the master tape and the high $T_c$ material of the intermediate. If there is a low $T_c$ outer layer of less than 0.4 micrometer, there should be additional interior low $T_c$ material to provide total low $T_c$ material equivalent to a thickness of at least 0.4 micrometer in order to provide good signal transfer to the copy tape, but there is no advantage to a total thickness of more than 5 micrometers.

Until a procedure is developed for applying uniform coatings having a high percentage of magnetizable particles, a low percentage of binder and a thickness of about 0.4 micrometer, it is preferred to use techniques for applying binderfree coatings such as sputtering, vapor coating, flash evaporation or electroplating. Moreover, the high $B_r$ of a binder-free magnetizable material enhances signal copying in contact duplication. On the other hand, a technique has not been developed for applying a binder-free layer of chromium dioxide which should otherwise be useful as the low $T_c$ material.

Since the surface of a binder-free layer is not protected from oxidation, belts having an outer layer of iron should not be handled except with gloves and should not be exposed to water or other excessively oxidizing conditions. With reasonable care, such belts are useful for some weeks or months. Care should be taken to prevent the accumulation of lint or other debris on the magnetizable surface of the belt.

THE DRAWING

DETAILED DESCRIPTION OF PREFERRED EMBODIMENT

Figure 1:
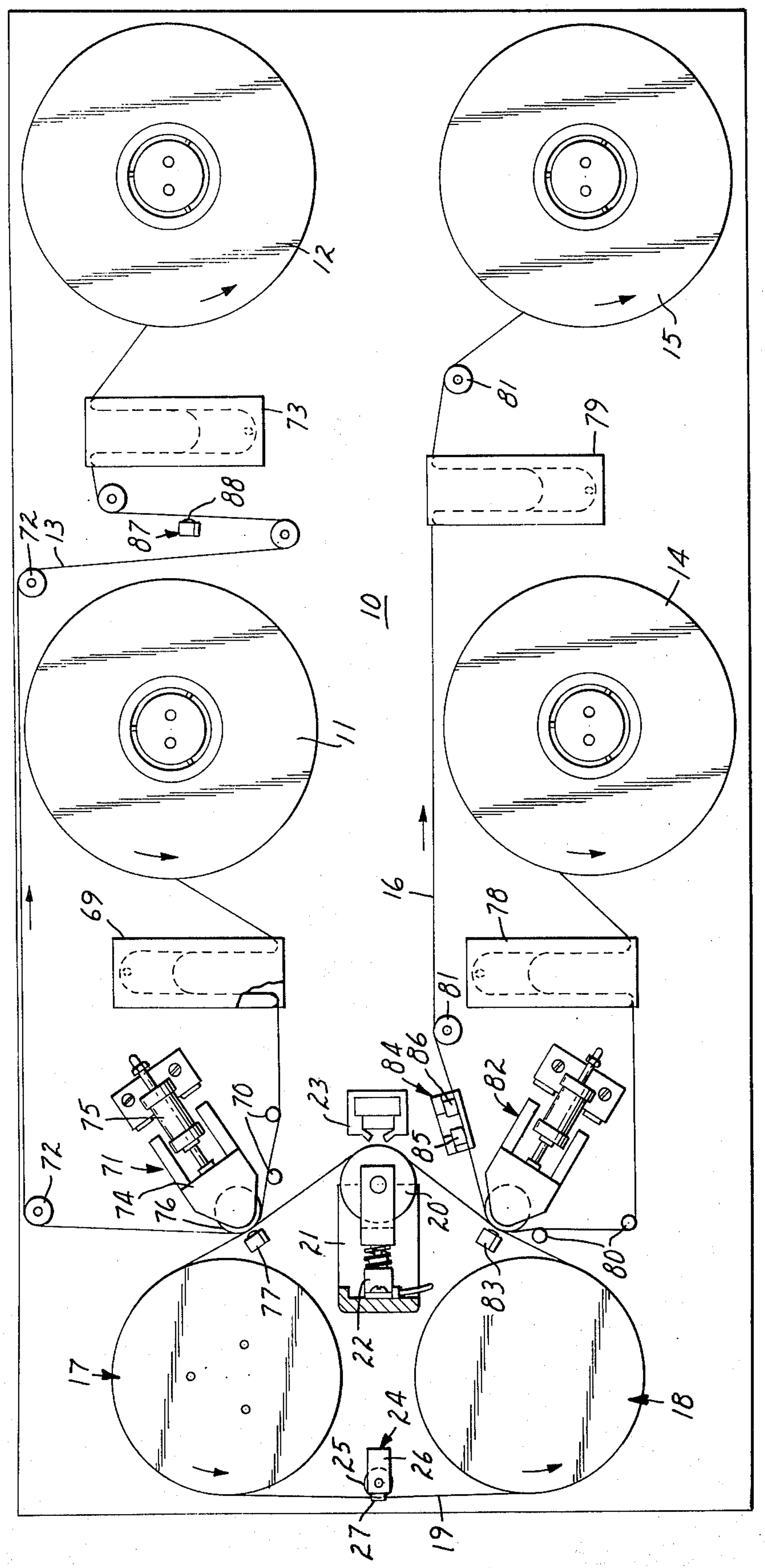
FIG. 1 is a schematic plan of apparatus embodying the present invention.

Referring to FIG. 1, a stress-relieved cast aluminum deck 10 has been machined with precision so that each part which attaches to the deck can be accurately mounted within 0.05 mm of a horizontal plane. Journalled in the deck 10 are spindles for a supply reel 11 and a takeup reel 12 for a master tape 13 and spindles for a supply reel 14 and a takeup reel 15 for a copy tape 16. Also journalled in the deck 10 are a hot drum 17 and a cold drum 18. An endless metal belt 19, constructed as described above, is carried by the hot drum 17, the cold drum 18 and a stainless steel tensioning roll 20 on a carriage 21 which is slideably mounted on the deck 10. An air-actuated piston 22 urges the carriage 21 and tensioning roll 20 outwardly to subject the belt 19 to a fixed tension of about 11 kg. A portion of the carriage 21 which extends under the deck 10 (and thus is not shown) carries an erase head 23 which is positioned so that the magnetizable face of the belt 19 is at all times barely out of contact with the head, e.g., at a spacing of 0.025 mm. The erase head 23 may be a strong permanent magnet but preferably is an electronic head to provide an alternating current erase field.

Figures 2, 5:
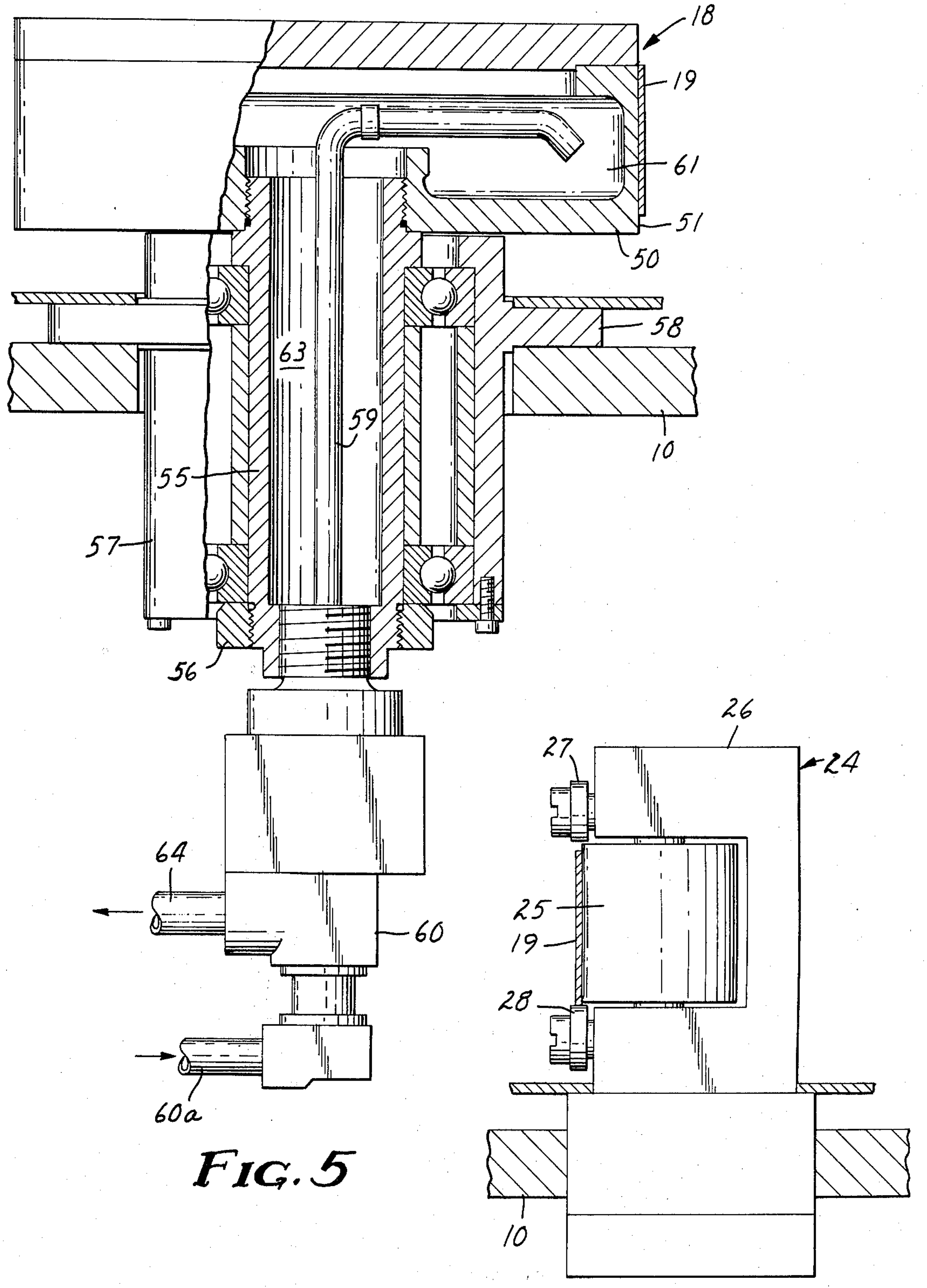
FIG. 2 is an enlarged elevation showing the beltguiding assembly employed in FIG. 1.
FIG. 5 is a plan view of the cold drum employed in FIG. 1, which view is cut away in part to a central section.

The belt 19 also passes over a belt-guiding assembly 24 which is fixed to the deck 10. Referring to FIG. 2, the belt-guiding assembly includes a stainless steel cylinder 25 of 3.2 cm diameter and a length equaling the width of the belt 19. The cylinder 25 is journalled at both ends to a block 26 fixedly mounted on the deck 10. Also journalled to the block 26 are a pair of stainless steel rollers 27, 28, each of which is 6 mm wide and 1.25 cm in diameter. The cylindrical surface of each roller 27, 28 is spaced approximately 0.025 mm from one end of the cylinder 25, and when the belt 19 moves either upward or downward, an edge of the belt strikes one of the rollers 27, 28 to maintain the belt substantially in tangential contact over the entire length of the cylinder 25.

Figures 3, 4:
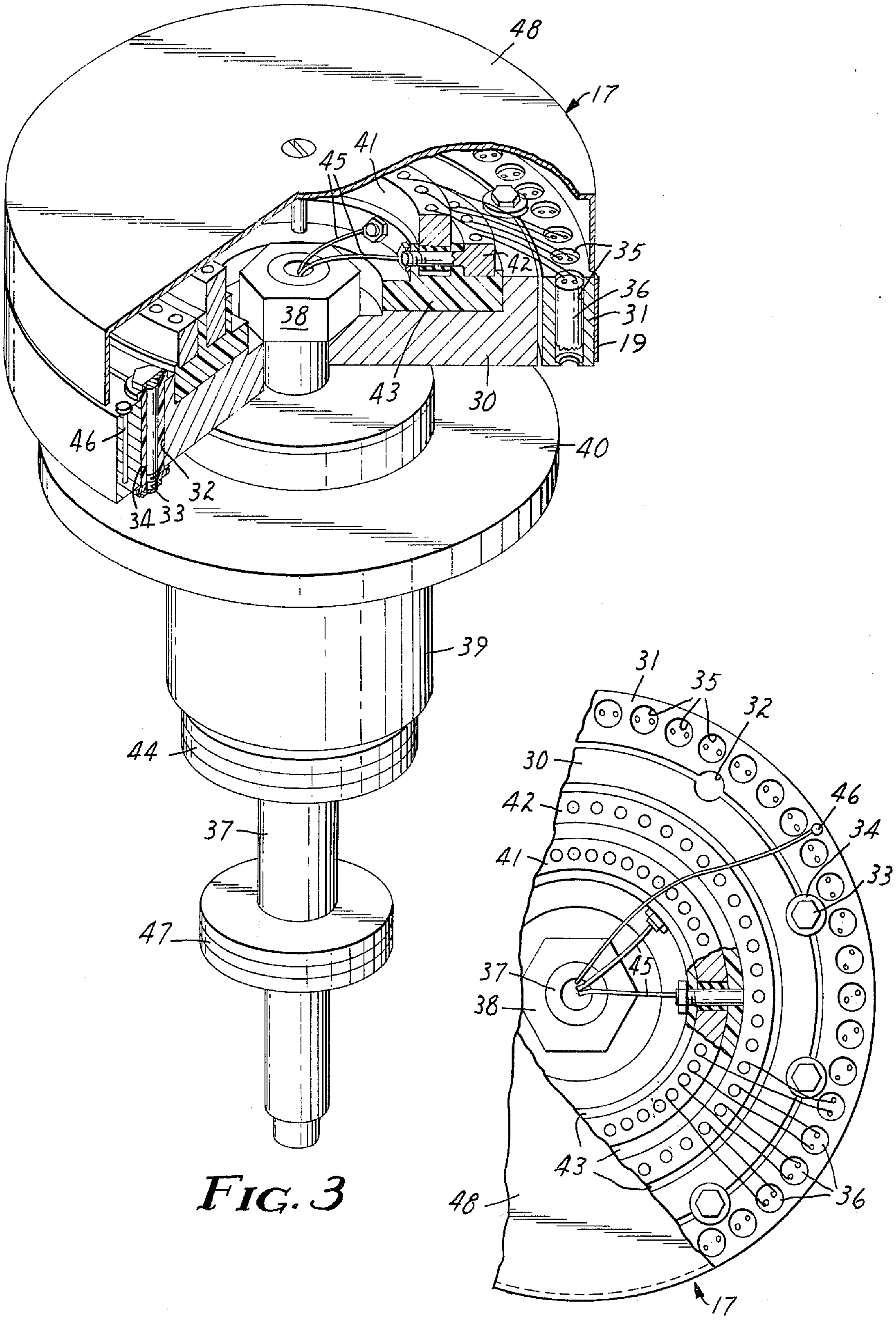
FIG. 3 is an isometric view showing the hot drum employed in FIG. 1, which view is cut away in part to a central section to reveal details of construction.
FIG. 4 is a top view of the hot drum with the protective cover removed.

Referring to FIGS. 3 and 4, the hot drum 17 comprises two separate rings, namely, a 17.5 cm diameter aluminum support ring 30 and an aluminum annular ring 31 of 20 cm inside diameter and 25 cm outside diameter. While clamped in the position shown, nine holes 32 are bored in the two rings 30, 31, which holes are centered on the space between the rings. The two rings are then secured together by bolts 33 which are insulated from the rings by polytetrafluoroethylene ("Teflon") gommets 34. The Teflon grommets expand into the holes 32 upon tightening to rigidly secure the annular ring 31 to the support ring 30. The support ring in turn is firmly held by a hollow threaded shaft 37 and hex nut 38 against a bearing assembly in a bearing housing 39 that is formed with a collar 40 which is bolted against the top of the deck 10 (not shown in FIG. 3).

The annular ring 31 has forty-five 1.25 cm bores 35, each containing a resistance heater 36 (Ogden model MW 515–2 12–1, 130 watts, 240 volts). Current to the heaters 36 is supplied from circular junction blocks 41, 42 which are bolted to an insulating disc 43, preferably formed from Teflon, which in turn is bolted to the support ring 30. Current is supplied to the junction blocks from conventional slip rings 44 via insulated wires 45. A protective cover 48 is bolted to the insulating disc 43.

At the periphery of the annular ring 31 are a pair of bores 180° apart, each containing a thermistor 46, the leads to which pass through the hollow shaft 37 to a second set of slip rings 47. One of the thermistors 46 is connected to a thermostat (not shown) for controlling the current to the heaters 36 and the other is connected to a safety mechanism, which only includes means for absolutely shutting off power to the heaters if their temperature exceeds a safe maximum.

Referring to FIG. 5, the cold drum 18 includes an aluminum jacket 50 formed with a cylindrical outer surface 51 which is 25 cm in diameter. The jacket 50 is threaded to the upper end of a hollow stainless steel shaft 55 which also is threaded at its lower end. A nut 56 secures the shaft 55 to a bearing assembly in a bearing housing 57 that is formed with a collar 58 bolted to the deck 10.

A stainless steel tube 59 which extends centrally through the hollow of the shaft 55 carries a refrigerant (e.g., "Freon" R 12) upwardly from a dual port rotary union 60 having an inlet 60*a* and sprays it into a circular space 61 whithin the jacket 50. The vaporized refrigerant then travels downward through a space 63 between tube 59 and the wall of the shaft 55 to an outlet 64 of the rotary union 60. The inlet 60*a* and outlet 64 are connected to conventional refrigeration apparatus (not shown). The refrigeration capacity and the rate of coolant flow should be sufficient to maintain the temperature of the belt-contacting surface 51 at about 10°–25°C during operation of the apparatus.

Figure 6:
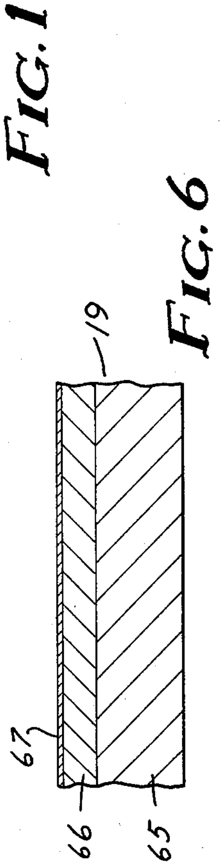
FIG. 6 is an enlarged schematic cross-section of the belt employed in FIG. 1.

Referring to FIG. 6, the belt 19 has a metal backing 65 such as beryllium copper 0.1 mm in thickness and 3.2 cm in width. The inner magnetizable layer 66 is a sputtered phosphide coating having a thickness of 1.0 micrometer, an $H_c$ of about 1500 oesteds and a Curie temperature of 100°–140°C. The outer magnetizable layer 67 is a sputtered iron coating having a thickness of 0.025 micrometer, an $H_c$ of 100–150 oersteds and a Curie temperature of about 700°C. The exposed surface of the metal backing 65 provides the circumferentially inner facing surface of the belt 19 which contacts the annular ring 31 of the hot drum 17 and the cylindrical outer surface 51 of the cold drum 18.

Referring again to FIG. 1, the master tape 13 passes from the supply reel 11 to a conventional vacuum column 69, a pair of vertically adjustable pin guides 70, around a nip roll assembly 71 and a series of fixed guide rolls 72 to another vacuum column 73 and the takeup reel 12. The nip roll assembly 71 comprises a carriage 74 which is slideably mounted on the deck 10, an air-actuated piston 75 which drives the carriage, and a rubber covered nip roll 76 which is journalled to the carriage 74. As the master tape 13 passes over the nip roll, the master tape 13 may be moved by the piston into contact with the belt 19, the position shown in FIG. 1. An adjustable stop (not shown) limits the travel so that the back side of the belt 19 is moved to a very small spacing of about 0.025 mm from a fixed magnetic stimulator 77 which provides a magnetic idealizing field substantially confined to the area of contact between the master tape 13 and the belt 19. The length of that contact measured along the length of the tape or belt is about 1 cm.

The mechanism for handling the copy tape 16 is similar to that of the master tape 13 in that it includes a pair of vacuum columns 78 and 79, a pair of pin guides 80 which are vertically adjustable and a series of guide rolls 81. The copy tape can be pressed against or retracted from the belt 19 by a nip roll assembly 82 which is identical in construction to the nip roll assembly 71. In the contacting position, the back side of the belt is moved to a spacing of about 0.025 mm from a fixed magnetic stimulator 83 which provides a magnetic idealizing field substantially confined to the area of contact between the belt 19 and the copy tape 16.

With both nip roll assemblies 71, 82 in the projected position, the belt 19 is moved laterally a short distance. Since the piston 22 applies constant pressure to the belt, the carriage 21 retracts slightly. However, the tension in the belt 19 applied by the piston 22 is sufficient to insure intimate contact with the belt by both the master tape 13 and the copy tape 16.

The vacuum columns 69, 73, 78 and 79 are of conventional construction. In each, a vacuum draws the tape to a central position at which the tape acts as a partial shutter for a photoelectric system (not shown) that controls the speed at which the nearest reel 11, 12, 14 and 15, respectively, is driven. When the tape is drawn below or above the center of vacuum column 69, the supply reel 11 is respectively slowed or accelerated until the tape returns to the central position.

Although the illustrated apparatus provides copies of video signals of good quality, the audio and control-track signals are copied somewhat less effectively. Accordingly, a head assembly 84 positioned adjacent the copy tape 16 includes a head stack 85 containing at least one audio erase head plus one control-track playback head and a head stack 86 containing an audio record head for each audio track plus a control-track record head. Another head assembly 87 is positioned adjacent the master tape 13 and includes a head stack 88 having an audio playback head for each audio track. The linear distances from the nip roll 76 are equal when measured along the master tape 13 to the playback head stack 88 and when measured along the belt 19 in the forward direction to the nip roll assembly 82 and thereafter along the copy tape 16 to the record head stack 86. Both head assemblies 84 and 87 are adjustable for azimuth, elevation and horizontal positioning along the tape paths.

The illustrated apparatus employs five drive motors (not shown). Four of these drive the reels 11, 12, 14, 15. The fifth motor drives the hot drum 17 at circumferential speeds of up to 3.8 meters per second. The tension in the belt 19 applied by the tensioning roll 20 is such that the belt moves at the speed of the drum without slippage. When the nip roll assemblies 71 and 82 engage the master and copy tapes 13, 16 with the belt 19, the tapes are driven by the belt at the speed of the belt, and easy of the supply and takeup reels respond under the sole control of the nearest vacuum column.

OPERATION

Preliminary to operation, the heating for the hot drum 17 and the cooling for the cold drum 18 are started; the piston 22 is energized to put the belt 19 under tension; the master and copy tapes 13, 16 are threaded in paths extending across the mouths of the vacuum columns with their magnetizable faces outward; and the head stacks 85, 86 and 88 are disabled. When the drums 17, 18 both reach operating temperature, an indicator light (not shown) advises that the copying operation can begin. The operator presses the start button (not shown) which actuates the reel drives, the vacuum columns 69, 73, 78 and 79 and a time delay mechanism (not shown) and energizes the nip roll assemblies 71, 82 to the engaged positions. As the tape is drawn into the vacuum columns, their photoelectric systems control the associated reels to pay out and take up tape as required. When the tape is drawn to about 25 percent of the depth of each vacuum column, a phototransistor (not shown) senses the presence of the tape. Upon receipt of such indications from all four phototransistors, the system is enabled and begins to operate at the end of the preset period of the time delay mechanism, the preset period having been previously adjusted to the time normally required for the tapes to reach central positions in the vacuum columns.

At the end of the preset period of the delay mechanism and subject to enabling indications from the phototransistors of all four vacuum columns, the drive motor for the hot drum 17 is energized, and the tapes should reach operating speed within one second. If one of the tapes should break, the tape immediately pulls out of one of its associated vacuum columns, and the resulting loss of enabling signal from the phototransistor of that vacuum column shuts down the operation.

In the initial operation of the apparauts, a master tape bearing a constant amplitude audio toned is used for adjustment of tape alignment. A portion of the signals duplicated on the copy tape is made visible by applying a suspension of superfine carbonyl iron powder in a solvent such as methyl alcohol and a wetting agent such as "Nekal" detergent which do not damage the magnetizable coating. The pin guides 70 and 80 are adjusted for any offset in the duplicated signal placement, and the procedure is repeated until the visual examination indicates approximately correct alignment. Final adjustment of the pin guides 70 and 80 is determined electronically using an appropriate video recorder.

If the apparatus is equipped with audio-track and control-track re-record functions, the head assembly 87 is adjusted for azimuth and elevation to achieve maximum playback amplitude. The re-record functions are energized and carbonyl iron powder is used to examine the re-recorded track locations. The head assembly 84 is adjusted for elevation and azimuth, and the head stack 85 is positioned horizontally such that the re-recorded control-track signals appear to be in the proper location, thus spacing the control-track record head from the control-track playback head by an integral number of the control-track signals. Final positioning of the heads is determined using an appropriate video recorder.

In full operation, signals on the master tape 13 are duplicated as a mirror image on the outer magnetizable layer 67 of the belt 19 as the two pass through the field of the magnetic stimulator 77. The hot drum 17 heats the inner magnetizable layer 66 somewhat above its Curie temperature, and the cold drum 18 cools it to below that temperature, thus copying the signals from the outer layer 67 onto the inner layer 66. As the belt 19 contacts the blank copy tape 16, the signals are duplicated as a second mirror image on the magnetizable layer of the copy tape by virtue of the field applied by the magnetic stimulator 83. As the copy tape passes the head stack 85, the duplicated audio signals are erased to permit the audio signals to be recorded electronically through the record head stack 86 from signals reproduced from the master tape 13 at the playback head stack 88.

The above-described apparatus is preset to operate at certain fixed speeds, with appropriate audio re-recording equalization for each speed. Any increase in speed requires increased heating and cooling, and the rate at which heat must be carried away during the cooling step can become very appreciable. Furthermore, at exceedingly high speeds, an inordinate proportion of the total time may be spent in mounting, threading and demounting the tapes, so that a top speed of 400 cm per second is regarded as entirely adequate for commercial purposes. On the other hand, a speed of 20 cm per second should be adequate for commercial purposes. Even slower speeds should be useful in that they would permit economies in both the heat exchanging and tape driving equipment. Slow speeds can be largely compensated by provision for multiple copy stations.

When the master tape is rewound for reuse, the nip roll assembly 71 is retracted and the vacuum column 69 is disabled to permit the supply reel 11 to be rotated at top speed. The vacuum column 73 remains in use during rewinding to prevent tape spillage and to sense for tape breakage. Rewinding speeds of about 600–700 cm per second are attained.

I claim:

1. Method of making direct-image copies of magnetic signals from a master magnetic recording medium onto a copy magnetic recording medium utilizing an intermediate comprising a backing member of low permeability and a magnetizable face comprising a first magnetizable material having high $H_c$ relative to the $H_c$ of the copy medium and a low Curie temperature $T_c$, and a second magnetizable material having relatively high $T_c$ and low $H_c$ relative to the $H_c$ of the master medium, said method comprising the sequential steps of 1. copying signals from the master medium onto the high $T_c$ material of the intermediate by magnetically stimulated contact duplication,
2. copying the signals from the high $T_c$ material onto the low $T_c$ material of the intermediate by heating the materials to a temperature between approximately the low $T_c$ and below the high $T_c$ and cooling to below the low $T_c$, and
3. copying the signals from the low $T_c$ material of the intermediate onto the copy medium by magnetically stimulated contact duplication.

2. Method as defined in claim 1 including as a subsequent step or steps sequentially copying the signals from the intermediate onto one or more additional copy media by magnetically stimulated contact duplication.

3. Method of making direct-image copies of magnetic signals from a master magnetic recording tape onto a copy tape comprising the sequential steps of 1. providing a belt having a backing member of low permeability and a magnetizable face comprising at least two layers of magnetizable materials, one or more of which layers have an $H_c$ which is high with respect to the coercivity of the copy tape and a low Curie temperature $T_c$ of 50°–200°C, and the alternate of which layer or layers have relatively high $T_c$ and an $H_c$ which is low with respect to the coercivity of the master tape, the outermost of which layers is no thicker than 0.4 micrometer,
2. pressing the magnetizable face of the master tape against the magnetizable face of the belt in the presence of a magnetic idealizing field having a field strength intermediate the $H_c$ of the master tape and of the high $T_c$ belt material to copy signals from the master onto the high $T_c$ belt material,
3. heating the magnetizable materials of the belt to a temperature of approximately the low $T_c$ and below the high $T_c$ and then cooling to below the low $T_c$ to copy signals from the high $T_c$ belt material onto the low $T_c$ belt material,
4. pressing the magnetizable face of the copy tape against the magnetizable face of the belt in the presence of a magnetic idealizing field having a field strength intermediate the $H_c$ of the copy tape and of the low $T_c$ belt material to copy signals from the belt onto the copy tape, and
5. magnetically erasing the belt for reuse.

4. Method as defined in claim 3 including as step (4), successively pressing the magnetizable face of each of a plurality of copy tapes against the magnetizable face of the belt in the presence of successive similar magnetic idealizing fields to copy signals from the low $T_c$ belt material onto each copy tape.

5. Method as defined in claim 1 wherein the master medium is a video tape, including as subsequent steps 4. erasing audio signals which were duplicated on the copy tape, and
5. reproducing audio signals electronically from the master tape and recording these electronically onto the copy medium in place of the erased audio signals.

6. System for making direct-image copies of magnetic signals from a master magnetic recording medium onto a copy magnetic recording medium, which system comprises:

1. an intermediate comprising a backing member of low permeability and a magnetizable face comprising a first magnetizable material having high $H_c$ relative to the $H_c$ of the copy medium and a low Curie temperature $T_c$ and a second magnetizable material of relatively high $T_c$ and low $H_c$ relative to the $H_c$ of the master medium,
2. means for moving the master medium and the intermediate in intimate face-to-face contact through a magnetic field for stimulating the high $T_c$ material of the intermediate to copy the signals onto the high $T_c$ material,
3. means for heating the magnetizable material of the intermediate to a temperature at least approximating the low $T_c$ but below the high $T_c$ and for cooling to a temperature below said low $T_c$ to copy the signals from the high $T_c$ material onto the low $T_c$ material of the intermediate, and
4. means for moving the intermediate and the copy medium in intimate face-to-face contact through a magnetic field for stimulating the copy medium the signals from the low $T_c$ material onto the copy medium.

7. System as defined in claim 6 which further includes 5. means for successively moving the intermediate in intimate face-to-face contact with one or more additional copy media in the presence of successive magnetic fields to copy signals from the low $T_c$ material onto the additional copy media.

8. System as defined in claim 7 wherein the intermediate is an endless belt, which system further includes 6. means for erasing the magnetizable material of the belt after it passes the last idealizing field and before the belt again contacts the master medium.

9. System as defined in claim 6 for use with a video tape master medium, which system further includes 5. a playback head or heads positioned for electronic reproduction of the audio track or tracks of the master medium, and
6. a record head or heads positioned to record on the audio track or tracks of the copy medium the signals electronically reproduced from the audio track or tracks of the master medium, at least one of said playback and record heads being adjustable longitudinally with respect to its associated medium to permit the heads to be positioned so that the distance from the point of copying signals from the master medium measured along the master medium to the playback head or heads equals the distance from that point to the record head or heads measured along the intermediate until it meets the copy medium and thereafter along the copy medium.

10. System for making direct-image copies of magnetic signals from a master magnetic recording medium onto a copy magnetic recording medium, the $H_c$ of each of which is 300–700 oersteds, which system comprises:

1. an intermediate having a backing member of low permeability and a magnetizable face comprising a first magnetizable layer having an $H_c$ of at least 1,000 oersteds and a Curie temperature $T_c$ 50°–200°C and a second magnetizable layer having an $H_c$ of 100–150 oersteds and a $T_c$ at least 50°C above the $T_c$ of the first magnetizable layer,
2. means for moving the master medium and the intermediate in intimate face-to-face contact through a magnetic field which exceeds the $H_c$ of the second magnetizable layer but is at least 50 oersteds less than the $H_c$ of the master medium to copy the signals onto the second magnetizable layer,
3. means for heating the magnetizable material of the intermediate to a temperature at least approximating the $T_c$ of the first magnetizable layer but below the $T_c$ of the second magnetizable layer and for cooling to a temperature below the $T_c$ of the first magnetizable layer to copy the signals from the second magnetizable layer onto the first magnetizable layer, and
4. means for moving the intermediate and the copy medium in intimate face-to-face contact through a magnetic field which exceeds the $H_c$ of the copy medium but is at least 50 oersteds less than the $H_c$ of the first magnetizable material to copy the signals from the first magnetizable layer onto the copy medium.

11. A magnetic recording medium having a backing member of low permeability and a magnetizable face comprising:

a first magnetizable material having a Curie temperature $T_c$ of 50°–350°C and an $H_c$ at room temperature of at least 500 oersteds, and a second magnetizable material having a $T_c$ at least 50°C higher than that of the first mentioned magnetizable material and an $H_c$ at room temperature of 100–150 oersteds, which medium is useful as an intermediate transfer medium for copying magnetic signals from a master recording medium having an $H_c$ higher than that of the second magnetizable material onto a copy magnetic recording medium having an $H_c$ lower than that of the first magnetizable material.

12. An intermediate transfer medium as defined in claim 11 wherein the backing member is a long tape or endless belt and the first magnetizable material is in one or more layers and the second magnetizable material is in one or more alternate layers.

13. A magnetic recording medium in the form of an endless belt which is useful for copying magnetic signals from a master tape onto a copy tape by contact duplication, which belt comprises a metal backing member of low permeability and a magnetizable face comprising a binder-free inner layer of magnetizable material having a Curie temperature of 50°–200°C and an $H_c$ at room temperature of at least 1,500 oersteds, which layer has a thickness of 0.4–5 micrometers, a binder-free outer layer of magnetizable material having a Curie temperature exceeding 400°C and an $H_c$ at room temperature of 100–150 oersteds, which layer has a thickness of 0.01–0.2 micrometer.

14. A magnetic recording medium as defined in claim 13 wherein said inner layer is a sputtered coating of approximately $M_2P$ where M is 80–90 mole percent iron, 10–20 mole percent cobalt and 0–5 mole percent nickel and said outer layer is a sputtered coating of iron, cobalt, nickel or alloys thereof.

15. A magnetic recording medium as defined in claim 14 wherein said inner layer has a thickness of 0.6 to 1.0 micrometer and said outer layer has a thickness of 0.025 to 0.6 micrometer.

* * * * *